(12) United States Patent
Pollino et al.

(10) Patent No.: US 12,104,018 B2
(45) Date of Patent: Oct. 1, 2024

(54) PHOTOCURABLE POLYMERS, PHOTOCURABLE POLYMER COMPOSITIONS AND LITHOGRAPHIC PROCESSES INCLUDING THE SAME

(71) Applicants: Solvay Specialty Polymers USA, LLC, Alpharetta, GA (US); Virginia Tech Intellectual Properties, Inc., Blacksburg, VA (US)

(72) Inventors: Joel Pollino, Johns Creek, GA (US); Stéphane Jeol, Saint-Genis Laval (FR); Kermit S. Kwan, Cumming, GA (US); Timothy Edward Long, Blacksburg, VA (US); Christopher Bryant Williams, Blacksburg, VA (US); Viswanath Meenakshisundarm, Blacksburg, VA (US); Nicholas Raymond Chartrain, Blacksburg, VA (US); Justin Sirrine, Alpharetta, GA (US); Katherine V. Heifferon, Christiansburg, VA (US)

(73) Assignees: SOLVAY SPECIALTY POLYMERS USA, LLC, Alpharetta, GA (US); VIRGINIA TECH INTELLECTUAL PROPERTIES, INC., Blacksburg, VA (US)

( * ) Notice: Subject to any disclaimer, the term of this patent is extended or adjusted under 35 U.S.C. 154(b) by 723 days.

(21) Appl. No.: 17/283,321

(22) PCT Filed: Oct. 1, 2019

(86) PCT No.: PCT/EP2019/076661
§ 371 (c)(1),
(2) Date: Apr. 7, 2021

(87) PCT Pub. No.: WO2020/074332
PCT Pub. Date: Apr. 16, 2020

(65) Prior Publication Data
US 2022/0002491 A1    Jan. 6, 2022

Related U.S. Application Data

(60) Provisional application No. 62/743,756, filed on Oct. 10, 2018.

(51) Int. Cl.
   *C08G 75/23*      (2006.01)
   *B29C 64/135*     (2017.01)
   *B33Y 70/00*      (2020.01)
   *B33Y 10/00*      (2015.01)

(52) U.S. Cl.
   CPC ............ *C08G 75/23* (2013.01); *B29C 64/135* (2017.08); *B33Y 70/00* (2014.12); *B33Y 10/00* (2014.12)

(58) Field of Classification Search
   USPC ............................................... 528/171
   See application file for complete search history.

(56) References Cited

U.S. PATENT DOCUMENTS

2017/0022312 A1    1/2017   Liu et al.

FOREIGN PATENT DOCUMENTS

| EP | 0106023 A2 * | 4/1984 | |
| WO | WO-2017003846 A1 * | 1/2017 | ............... C08K 3/22 |
| WO | 2017174546 A1 | 10/2017 | |

OTHER PUBLICATIONS

Sangermano et al: "Synthesis, preparation and characterization of UV-cured methacrylated polysulfone-based membranes", Materials Today Communications, vol. 5, Dec. 1, 2015 (Dec. 1, 2015), pp. 64-69 (Year: 2015).*
Serbanescu et al. Polysulfone functionalized membranes: Properties and challenges; Materials Today Chemistry vol. 17, Sep. 2020, 100302 (Year: 2020).*
CN 108407291 A (abstract) (Year: 2018).*
Sangermano M. et al., "Synthesis, preparation and characterization of UV-cured methacrylated polysulfone-based membranes", Materials Today Communications, 2015 (Dec. 1, 2015), vol. 5, pp. 64-69, Elesevier Ltd.
Carve M. et al., "3D-Printed Chips: Compatibility of Additive Manufacturing Photopolymeric Substrata with Biological Applications", Micromachines, 2018 (Feb. 23, 2018), vol. 9 No. 2, p. 91 (20 pages).

* cited by examiner

*Primary Examiner* — Terressa Boykin
(74) *Attorney, Agent, or Firm* — Osha Bergman Watanabe & Burton LLP

(57) ABSTRACT

The present invention relates to relates to a polymer formulation for three-dimensionally (3D) printing an article by stereolithography, the formulation comprising a functionalized polymer. The invention further relates to lithographic methods to form 3D objects that incorporate the aforementioned polymer formulation.

15 Claims, 3 Drawing Sheets

PHOTOCURABLE POLYMERS, PHOTOCURABLE POLYMER COMPOSITIONS AND LITHOGRAPHIC PROCESSES INCLUDING THE SAME

RELATED APPLICATION

This application is a U.S. national stage entry under 35 U.S.C. § 371 of international patent application No. PCT/EP2019/076661 filed on Oct. 1, 2019, which claims priority to U.S. provisional patent application No. 62/743,756, filed on Oct. 10, 2018, the whole content of this application being explicitly incorporated herein by reference.

TECHNICAL FIELD

The present invention relates to a polymer formulation for three-dimensionally (3D) printing an article by stereolithography, the formulation comprising a functionalized polymer. The invention further relates to lithographic methods to form 3D objects that incorporate the aforementioned polymer formulation.

BACKGROUND ART

Lithographic processes for the photofabrication of 3D articles from polymeric materials have found recent popularity due to their relative speed and simplicity. In general, lithographic processes involve the use of light, for example UV irradiation, to locally cure a polymerizable formulation at specific locations. The localized curing allows for the fabrication of 3-dimensional articles.

Lithographic processes generally use polymerizable formulations that are liquid in order to obtain parts with a good resolution. Polymerizable formulations that are liquid at room temperature are easier to use in a printing process, but they generally lead to articles having moderate mechanical properties and thermal stability.

Certain polymers used in the lithographic processes present a good mechanical property profile. These polymers need to be melt above their melting temperature to be used in liquid polymerizable formulations. One of the challenges in the identification of valuable polymers is that they need to remain thermally stable at the polymer melting temperature and be reactive in the printing process when irradiating the layer of polymerizable formulation.

Another challenge in the identification of valuable polymerizable formulations to be used in lithographic processes is that they have to be capable of producing 3D articles that present good mechanical properties after photofabrication and substantially retain these mechanical properties after exposure to high temperature, for example above 150° C.

The polymerizable formulations of the present invention provide a well-suited solution for high temperature 3D printing processes.

SUMMARY OF THE INVENTION

The present invention relates to a polymer formulation (F) comprising a polymer (P) selected from the poly(aryl ethersulfone) (PAES) and the polyetherimide (PEI) polymers, wherein the polymer (P) comprises at least one terminal group of formula (M1) or (M2):

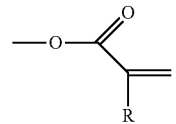

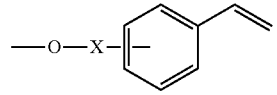

wherein
R is H or $CH_3$,
X is a bond or $(CH_2)_n$ with n ranging from 1 to 20, and wherein the number average molecular weight (Mn) of the polymer (P) is of less than 40,000 g/mol, less than 35,000 g/mol, less than 30,000 g/mol, less than 25,000 g/mol, less than 20,000 g/mol, less than 15,000 g/mol, or less than 10,000 g/mol, as determined by gel permeation chromatography (GPC) using methylene chloride as a mobile phase and polystyrene standards.

This polymer formulation (F) can be for example used in photofabrication processes. In particular, the formulation (F) of the present invention can be incorporated into lithographic processes in which light is used to cure the functionalized polymers. The formulation (F) of the present invention can be turned into a liquid state at a temperature below or above the Tg of polymer (P) without noticeable change and then be cured by irradiation of UV light, producing high thermal properties materials having high Tg, high mechanical properties and high thermal stability. The formulation (F) of the invention can effectively be used in 3D printing lithographic processes.

The present invention also relates to a method for manufacturing a three-dimensional (3D) article with an additive manufacturing system, comprising:
providing a polymer formulation (F) according to the invention, and
printing layers of the 3D article from the polymer formulation (F).

According to another embodiment of the present invention, the step of printing comprises irradiating the polymer formulation (F) with UV light. The UV light can for example be laser light.

The present invention also relates to 3D article obtainable, at least in part, by the method described above, and the use of the polymer formulation (F), for the manufacture of 3D objects by stereolithography (SLA).

DISCLOSURE OF INVENTION

Figure 1:
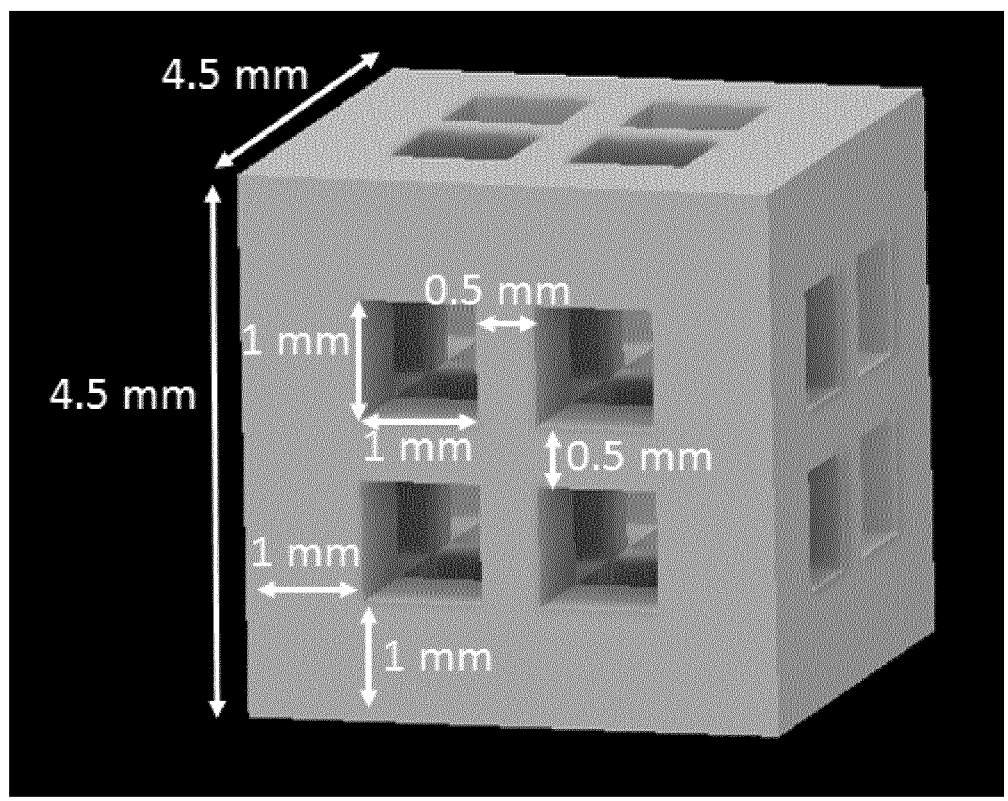
FIG. 1 is a schematic representation of the 3D object to be printed.

The present invention relates to a polymer formulation (F) comprising at least one polymer (P) selected from the group consisting of poly(aryl ethersulfone) (PAES) polymer and polyetherimide (PEI) polymer, wherein the polymer (P) has been functionalized. More precisely, the polymer (P) comprises at least one terminal group of formula (M1) or (M2):

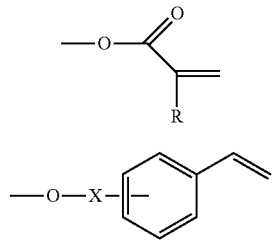

wherein
- R is H or CH$_3$,
- X is a bond or (CH$_2$)$_n$ with n ranging from 1 to 20, for example from 1 to 10 or from 1 to 8.

According to the present invention, the number average molecular weight (Mn) of the polymer (P) is of less than 40,000 g/mol, less than 35,000 g/mol, less than 30,000 g/mol, less than 25,000 g/mol, less than 20,000 g/mol, less than 15,000 g/mol, or less than 10,000 g/mol, as determined by gel permeation chromatography (GPC) using methylene chloride as a mobile phase and polystyrene standards. Preferably, the number average molecular weight (Mn) of the polymer (P) is of less than less than 20,000 g/mol.

The formulation (F) comprising the functionalized polymer (P) of the invention can be used in photofabrication processes. In particular, the polymer (P) and polymer formulation (F) of the present invention can be incorporated into lithographic processes in which light is used to cure the functionalized polymers.

The formulation (F) of the present invention also comprises:
- at least one solvent,
- at least one photoinitiator, and
- at least one blocker.

The formulation (F) of the present invention is preferably liquid, for example at room temperature or above.

According to the present invention, a photoinitiator is a compound especially added to a formulation to convert absorbed light energy, UV or visible light, into chemical energy in the form of initiating species, for example free radicals or cations.

According to the present invention, a blocker is a compound added to either scavenge unused radicals created by the photoinitiator or absorb a portion of the incident UV energy. This compound allows for improving dimensional accuracy of the fabricated part.

The polymer (P) described in the present invention is functionalized with a functional group, which is a (meth)acrylic moiety (M1) and/or a styrene (M2). The functional groups are introduced as a postpolymerization modification at at least one end of the polymer chain, for example at both ends of the polymer chain, and/or into side chains of the polymer backbone.

More precisely, the polymer (P) described in the present invention is functionalized at at least one end of the polymer chain, as a "terminal functionalization". The polymer (P) of the present invention can be functionalized at both ends of the polymer chain. The polymer (P) of the present invention can also be functionalized within the polymer backbone, as an "internal functionalization". For example, with respect to internal functionalization, one or more of the recurring units of the polymer (P) that are not disposed at the end of the polymer chain can be functionalized with a functional group, which is a (meth)acrylic moiety.

The formulation (P) of the present invention can comprise more than one polymer (P), for example two of three distinct polymers (P).

Poly(aryl Ethersulfone) (PAES)

According to an embodiment, P is a PAES having recurring units (R$_{PAES}$) of formula (L):

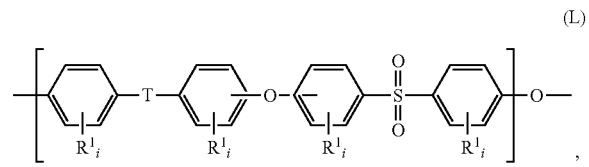

each R$^1$ is independently selected from the group consisting of a halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium;

each i is an independently selected integer from 0 to 4 for each aromatic cycle;

T is selected from the group consisting of a bond, —CH$_2$—; —O—; —SO$_2$—; —S—; —C(O)—; —C(CH$_3$)$_2$—; —C(CF$_3$)$_2$—; —C(=CCl$_2$)—; —C(CH$_3$)(CH$_2$CH$_2$COOH)—; —N=N—; —R$_a$C=CR$_b$—, where each R$_a$ and R$_b$, independently of one another, is a hydrogen or a C1-C12-alkyl, C1-C12-alkoxy, or C6-C18-aryl group; —(CH$_2$)$_m$— and —(CF$_2$)$_m$— with m being an integer from 1 to 6; an aliphatic divalent group, linear or branched, of up to 6 carbon atoms; and combinations thereof;

R is H or CH$_3$.

According to an embodiment, when P is a PAES, the polymer (P) of the present invention can comprise:

at least recurring units (R$_{PAES}$) of formula (L):

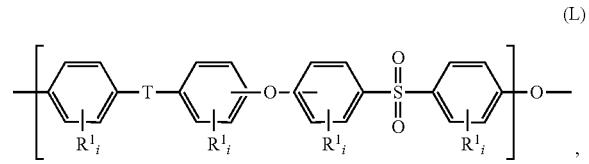

and/or at least one terminal group of formula (M):

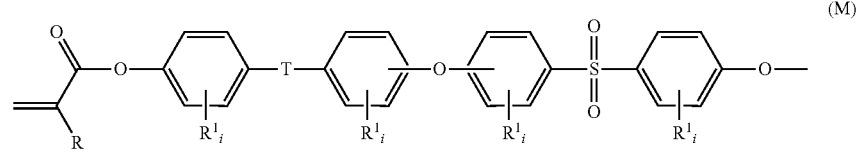

wherein:
- each $R^1$ is independently selected from the group consisting of a halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium;
- each i is an independently selected integer from 0 to 4 for each aromatic cycle;
- T is selected from the group consisting of a bond, —CH$_2$—; —O—; —SO$_2$—; —S—; —C(O)—; —C(CH$_3$)$_2$—; —C(CF$_3$)$_2$—; —C(=CCl$_2$)—; —C(CH$_3$)(CH$_2$CH$_2$COOH)—; —N=N—; —R$_a$C=CR$_b$—, where each R$_a$ and R$_b$, independently of one another, is a hydrogen or a C1-C12-alkyl, C1-C12-alkoxy, or C6-C18-aryl group; —(CH$_2$)$_m$— and —(CF$_2$)$_m$— with m being an integer from 1 to 6; an aliphatic divalent group, linear or branched, of up to 6 carbon atoms; and combinations thereof;
- R is H or CH$_3$.

According to another embodiment, the recurring units ($R_{PAES}$) are according to formula (L'):

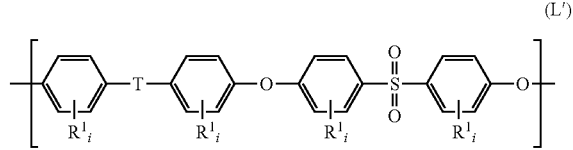

wherein $R^1$ and i are as above-mentioned.

According to an embodiment, the terminal group(s) of the polymer (P) are according to formula (M'):

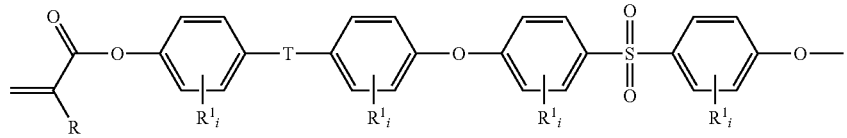

wherein $R^1$, R and i are as above-mentioned.

According to an embodiment, i is zero for each $R^1$. In other words, according to this embodiment, the recurring units ($R_{PAES}$) are units of formula (L"):

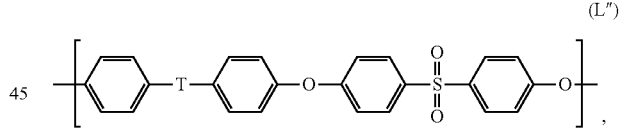

and the terminal group(s) of the polymer (P) are according to formula (M"):

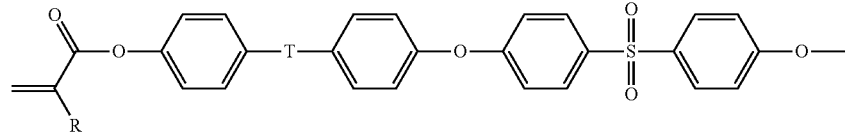

wherein T is as above-mentioned.

According to an embodiment, P is a PAES having at least 50 mol. % (based on the total number of moles in the polymer) of recurring units of formula (L), (L') or (L") and comprises at least one at least one terminal group of formula (M), (M') or (M").

According to an embodiment of the present invention, at least 60 mol. %, at least 70 mol. %, at least 80 mol. %, at least 90 mol. %, at least 95 mol. %, at least 99 mol. % (based on the total number of moles in the polymer) or all of the recurring units in the PAES are recurring units ($R_{PAES}$) of formula (L), (L') or (L") and comprises at least one at least one terminal group of formula (M), (M') or (M").

According to an embodiment of the present invention, P is a PAES wherein T is selected from the group consisting of a bond, —$SO_2$— and —$C(CH_3)_2$—.

According to another embodiment of the present invention, P is a PAES having at least 50 mol. % (based on the total number of moles in the polymer) of recurring units selected from the group consisting of formulas:

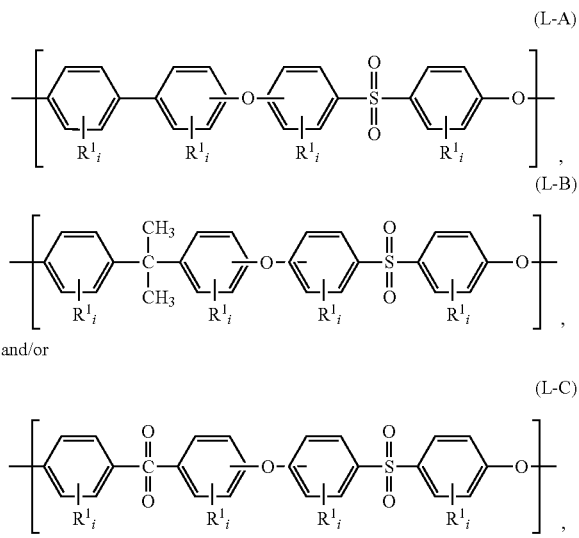

and/or wherein $R^1$ and i are as above-mentioned.

According to this embodiment, at least 60 mol. %, at least 70 mol. %, at least 80 mol. %, at least 90 mol. %, at least 95 mol. %, at least 99 mol. % (based on the total number of moles in the polymer) or all of the recurring units in the PAES are recurring units ($R_{PAES}$) of formula (L-A), formula (L-B) and/or formula (L-C).

According to an embodiment, P is a PAES wherein T is a bond. In other words, P is a functionalized poly(biphenyl ether sulfone) (PPSU).

According to an embodiment, P is a PPSU comprising: at least 50 mol. % of the recurring units are recurring units ($R_{PPSU}$) of formula (L-A):

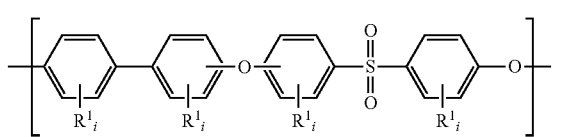

(the mol. % being based on the total number of moles in the polymer), wherein $R^1$ and i are as above-mentioned, and at least one terminal group of formula (M1) or (M2):

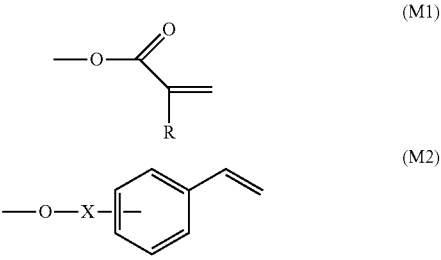

wherein
R is H or $CH_3$, and
X is a bond or $(CH_2)_n$ with n varying from 1 to 20, for example 1 to 10, preferably being equal to 1 or 2.

The PPSU polymer of the present invention can be a homopolymer or a copolymer. If it is a copolymer, it can be a random, alternate or block copolymer.

According to an embodiment of the present invention, at least 60 mol. %, at least 70 mol. %, at least 80 mol. %, at least 90 mol. %, at least 95 mol. %, at least 99 mol. % or all of the recurring units in the PPSU are recurring units ($R_{PPSU}$) of formula (L-A).

When the poly(biphenyl ether sulfone) (PPSU) is a copolymer, it can be made of recurring units ($R*_{PPSU}$), different from recurring units ($R_{PPSU}$), such as recurring units of formula (L-B) and/or formula (L-C), both above-described, and/or recurring units of formula (L-D):

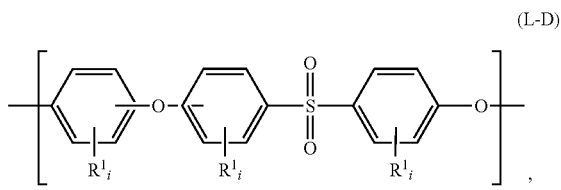

wherein $R^1$ and i are as above-mentioned.

The poly(biphenyl ether sulfone) (PPSU) can be prepared by any method known in the art. It can for example result from the condensation of 4,4'-dihydroxybiphenyl (biphenol) and 4,4'-dichlorodiphenyl sulfone in presence of a base. The reaction of monomer units takes place through nucleophilic aromatic substitution with the elimination of one unit of hydrogen halide as leaving group. It is to be noted however that the structure of the resulting poly(biphenyl ether sulfone) does not depend on the nature of the leaving group. The PPSU is then modified after polymerisation to introduce the functional group at at least one end of the polymer chain. The functional group is an alpha-olefin of formula $CH_2$=CH—$CH_2$—$(CH_2)_n$— wherein n varies between 1 and 10. Alpha-olefin functional groups can also be introduced at both ends of the polymer chain, and/or into side chains of the polymer backbone.

According to an embodiment, P is a PAES wherein T is —$C(CH_3)_2$—. In other words, P is a functionalized polysulfone (PSU).

According to an embodiment, P is a PSU comprising:

at least 50 mol. % of the recurring units are recurring units ($R_{PSU}$) of formula (L-B):

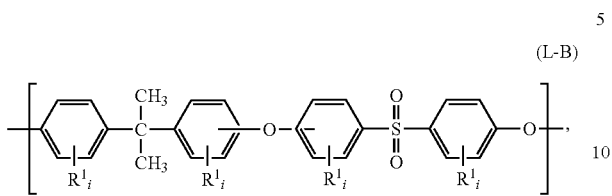

(L-B)

(the mol. % being based on the total number of moles in the polymer), wherein $R^1$ and i are as above-mentioned, and at least one terminal group of formula (M1) or (M2):

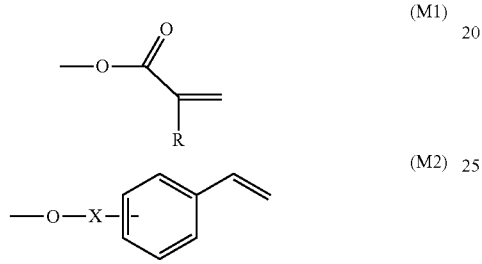

(M1)

(M2)

wherein

R is H or $CH_3$, and

X is a bond or $(CH_2)_n$ with n varying from 1 to 20, for example 1 to 10, preferably being equal to 1 or 2.

The PSU polymer of the present invention can therefore be a homopolymer or a copolymer. If it is a copolymer, it can be a random, alternate or block copolymer.

According to an embodiment of the present invention, at least 60 mol. %, at least 70 mol. %, at least 80 mol. %, at least 90 mol. %, at least 95 mol. %, at least 99 mol. % or all of the recurring units in the PSU are recurring units ($R_{PSU}$) of formula (L-B).

When the polysulfone (PSU) is a copolymer, it can be made of recurring units ($R^*_{PSU}$), different from recurring units ($R_{PSU}$), such as recurring units of formula (L-A), (L-C) and/or (L-D), all above-described.

According to an embodiment, P is a PAES wherein T is —$SO_2$—. In other words, P is a functionalized polyethersulfone (PES).

According to an embodiment, P is a PES comprising:

at least 50 mol. % of the recurring units are recurring units ($R_{PES}$) of formula (L-C):

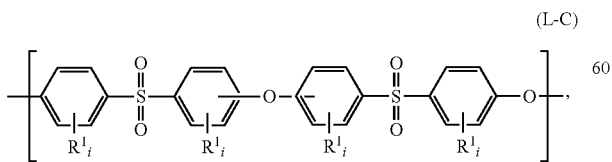

(L-C)

(the mol. % being based on the total number of moles in the polymer), wherein $R^1$ and i are as above-mentioned, and at least one terminal group of formula (M1) or (M2):

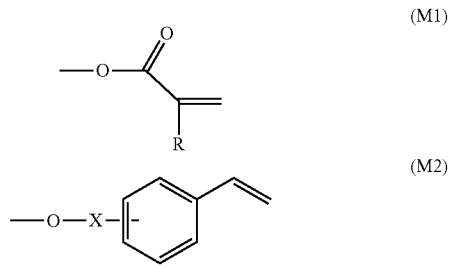

(M1)

(M2)

wherein

R is H or $CH_3$, and

X is a bond or $(CH_2)_n$ with n varying from 1 to 20, for example 1 to 10, preferably being equal to 1 or 2.

The PES polymer of the present invention can therefore be a homopolymer or a copolymer. If it is a copolymer, it can be a random, alternate or block copolymer.

According to an embodiment of the present invention, at least 60 mol. %, at least 70 mol. %, at least 80 mol. %, at least 90 mol. %, at least 95 mol. %, at least 99 mol. % or all of the recurring units in the PES are recurring units ($R_{PES}$) of formula (L-C).

When the polyethersulfone (PES) is a copolymer, it can be made of recurring units ($R^*_{PESU}$), different from recurring units ($R_{PESU}$), such as recurring units of formula (L-A), (L-B) and/or (L-D), all above-described.

Poly(ether imide) (PEI)

According to an embodiment, P is a PEI having recurring units ($R_{PEI}$) comprising at least one aromatic ring, at least one imide group, as such and/or in its amic acid form, and at least one ether group. Recurring units ($R_{PEI}$) may optionally further comprise at least one amide group which is not included in the amic acid form of an imide group.

According to an embodiment, the recurring units ($R_{PEI}$) are selected from the group consisting of following formulas (I), (II), (III), (IV), (V) and mixtures thereof:

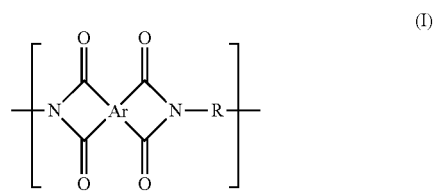

(I)

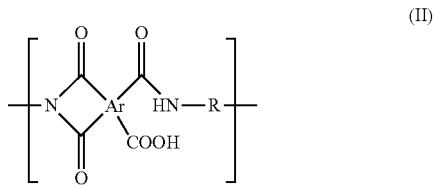

(II)

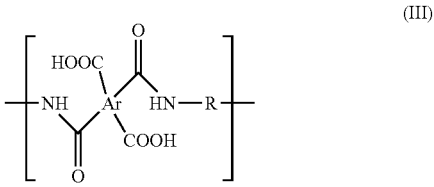

(III)

-continued

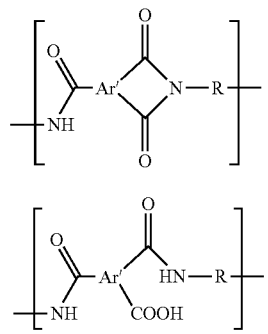

(IV)

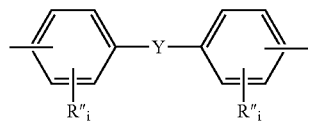

(V)

where
Ar is a tetravalent aromatic moiety and is selected from the group consisting of a substituted or unsubstituted, saturated, unsaturated or aromatic monocyclic and polycyclic group having 5 to 50 carbon atoms;
Ar' is a trivalent aromatic moiety and is selected from the group consisting of a substituted, unsubstituted, saturated, unsaturated, aromatic monocyclic and aromatic polycyclic group having from 5 to 50 C atoms; and
R is selected from the group consisting of substituted and unsubstituted divalent organic radicals, for example selected from the group consisting of
(a) aromatic hydrocarbon radicals having 6 to 20 carbon atoms and halogenated derivatives thereof;
(b) straight or branched chain alkylene radicals having 2 to 20 carbon atoms;
(c) cycloalkylene radicals having 3 to 20 carbon atoms, and
(d) divalent radicals of formula (VI):

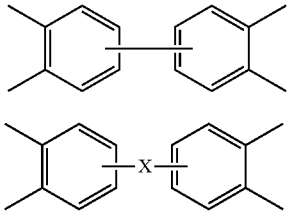

(VI)

where
Y is selected from the group consisting of alkylenes of 1 to 6 carbon atoms, for example —C(CH$_3$)$_2$ and —C$_n$H$_{2n}$— (n being an integer from 1 to 6); perfluoroalkylenes of 1 to 6 carbon atoms, for example —C(CF$_3$)$_2$ and —C$_n$F$_{2n}$—
(n being an integer from 1 to 6); cycloalkylenes of 4 to 8 carbon atoms; alkylidenes of 1 to 6 carbon atoms; cycloalkylidenes of 4 to 8 carbon atoms; —O—; —S—; —C(O)—; —SO$_2$—; —SO—, and
R" is selected from the group consisting of hydrogen, halogen, alkyl, alkenyl, alkynyl, aryl, ether, thioether, carboxylic acid, ester, amide, imide, alkali earth metal sulfonate, alkaline earth metal sulfonate, alkyl sulfonate, alkali earth metal phosphonate, alkaline earth metal phosphonate, alkyl phosphonate, amine and quaternary ammonium and
i, for each R", is independently zero or an integer ranging from 1 to 4, with the provisio that at least one of Ar, Ar' and R comprise at least one ether group and that the ether group is present in the polymer chain backbone.
According to an embodiment, Ar is selected from the group consisting of formulas:

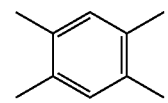

(VII)

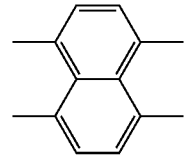

(VIII)

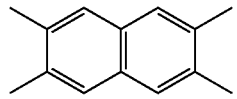

(IX)

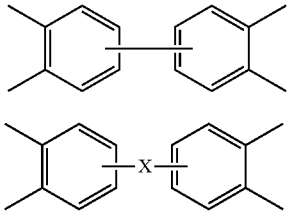

(X)

(XI)

where
X is a divalent moiety, having divalent bonds in the 3,3', 3,4', 4,3" or the 4,4' positions and is selected from the group consisting of alkylenes of 1 to 6 carbon atoms, for example —C(CH$_3$)$_2$ and —C$_n$H$_{2n}$— (n being an integer from 1 to 6); perfluoroalkylenes of 1 to 6 carbon atoms, for example —C(CF$_3$)$_2$ and —C$_n$F$_{2n}$— (n being an integer from 1 to 6); cycloalkylenes of 4 to 8 carbon atoms; alkylidenes of 1 to 6 carbon atoms; cycloalkylidenes of 4 to 8 carbon atoms; —O—; —S—; —C(O)—; —SO$_2$—; —SO—;
or X is a group of the formula —O—Ar"—O—, wherein Ar" is a aromatic moiety selected from the group consisting of a substituted or unsubstituted, saturated, unsaturated or aromatic monocyclic and polycyclic group having 5 to 50 carbon atoms.

According to an embodiment, Ar' is selected from the group consisting of formulas:

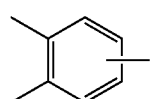

(XII)

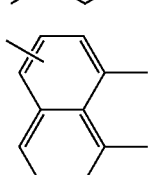

(XIII)

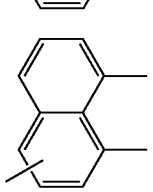

(XIV)

-continued

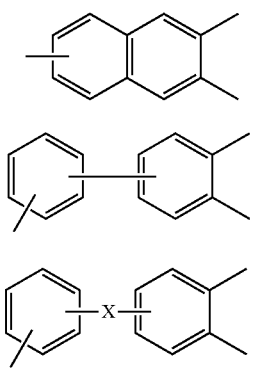

where

X is a divalent moiety, having divalent bonds in the 3,3', 3,4', 4,3" or the 4,4' positions and is selected from the group consisting of alkylenes of 1 to 6 carbon atoms, for example —C(CH$_3$)$_2$ and —C$_n$H$_{2n}$— (n being an integer from 1 to 6); perfluoroalkylenes of 1 to 6 carbon atoms, for example —C(CF$_3$)$_2$ and —C$_n$F$_{2n}$— (n being an integer from 1 to 6); cycloalkylenes of 4 to 8 carbon atoms; alkylidenes of 1 to 6 carbon atoms; cycloalkylidenes of 4 to 8 carbon atoms; —O—; —S—; —C(O)—; —SO$_2$—; —SO—;

or X is a group of the formula —O—Ar"—O—, wherein Ar" is a aromatic moiety selected from the group consisting of a substituted or unsubstituted, saturated, unsaturated or aromatic monocyclic and polycyclic group having 5 to 50 carbon atoms.

According to an embodiment of the present disclosure, at least 50 mol. %, at least 60 mol. %, at least 70 mol. %, at least 80 mol. %, at least 90 mol. %, at least 95 mol. %, at least 99 mol. % or all of the recurring units in the PEI are recurring units (R$_{PEI}$) of formulas (I), (II), (III), (IV), (V) and/or mixtures thereof, as defined above.

According to an embodiment, P is a PEI having at least 50 mol. %, based on the total number of moles in the polymer, of recurring units (R$_{PEI}$) of formula (VII):

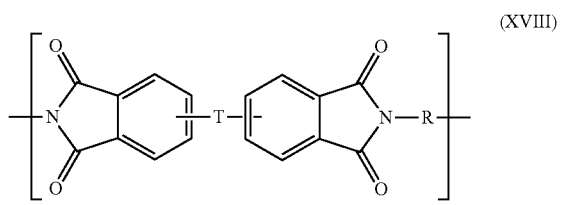

where

R is selected from the group consisting of substituted and unsubstituted divalent organic radicals, for example selected from the group consisting of (a) aromatic hydrocarbon radicals having 6 to 20 carbon atoms and halogenated derivatives thereof;

(b) straight or branched chain alkylene radicals having 2 to 20 carbon atoms;

(c) cycloalkylene radicals having 3 to 20 carbon atoms, and (d) divalent radicals of formula (VI):

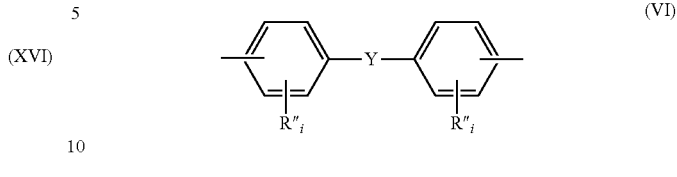

where

Y is selected from the group consisting of alkylenes of 1 to 6 carbon atoms, for example —C(CH$_3$)$_2$ and —C$_n$H$_{2n}$— (n being an integer from 1 to 6); perfluoroalkylenes of 1 to 6 carbon atoms, for example —C(CF$_3$)$_2$ and —C$_n$F$_{2n}$—

(n being an integer from 1 to 6); cycloalkylenes of 4 to 8 carbon atoms; alkylidenes of 1 to 6 carbon atoms; cycloalkylidenes of 4 to 8 carbon atoms; —O—; —S—; —C(O)—; —SO$_2$—; —SO—, and R" is selected from the group consisting of hydrogen, halogen, alkyl, alkenyl, alkynyl, aryl, ether, thioether, carboxylic acid, ester, amide, imide, alkali earth metal sulfonate, alkaline earth metal sulfonate, alkyl sulfonate, alkali earth metal phosphonate, alkaline earth metal phosphonate, alkyl phosphonate, amine and quaternary ammonium and i, for each R", is independently zero or an integer ranging from 1 to 4, with the proviso that at least one of Ar, Ar' and R comprise at least one ether group and that the ether group is present in the polymer chain backbone.

T can either be

—O— or —O—Ar"—O— wherein the divalent bonds of the —O— or the —O—Ar"—O— group are in the 3,3', 3,4', 4,3', or the 4,4' positions, wherein Ar" is a aromatic moiety selected from the group consisting of a substituted or unsubstituted, saturated, unsaturated or aromatic monocyclic and polycyclic group having 5 to 50 carbon atoms, for example a substituted or unsubstituted phenylene, a substituted or unsubstituted biphenyl group, a substituted ou unsubstituted naphtalene group or a moiety comprising two substituted or unsubstituted phenylene.

According to an embodiment of the present disclosure, Ar" is of the general formula (VI), as detailed above; for example, Ar" is of formula (XIX):

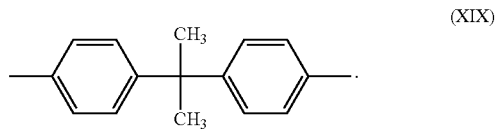

The polyetherimides (PEI) of the present invention may be prepared by any of the methods well-known to those skilled in the art including the reaction of a diamino compound of the formula H$_2$N—R—NH$_2$ (XX), where R is as defined before, with any aromatic bis(ether anhydride)s of the formula (XXI):

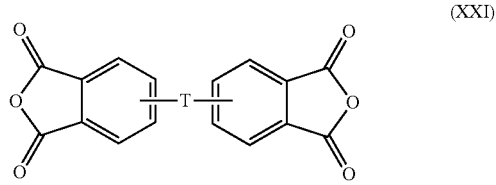

where T as defined before.

In general, the preparation can be carried out in solvents, e.g., o-dichlorobenzene, m-cresol/toluene, N,N-dimethylacetamide, at temperatures ranging from 20° C. to 250° C.

Alternatively, these polyetherimides can be prepared by melt polymerization of any dianhydrides of formula (XXI) with any diamino compound of formula (XX) while heating the mixture of the ingredients at elevated temperatures with concurrent intermixing.

The aromatic bis(ether anhydride)s of formula (XXI) include, for example:
2,2-bis[4-(2,3-dicarboxyphenoxy)phenyl]propane dianhydride;
4,4'-bis(2,3-dicarboxyphenoxy)diphenyl ether dianhydride;
1,3-bis(2,3-dicarboxyphenoxy)benzene dianhydride;
4,4'-bis(2,3-dicarboxyphenoxy)diphenyl sulfide dianhydride;
1,4-bis(2,3-dicarboxyphenoxy)benzene dianhydride;
4,4'-bis(2,3-dicarboxyphenoxy)benzophenone dianhydride;
4,4'-bis(2,3-dicarboxyphenoxy)diphenyl sulfone dianhydride;
2,2-bis[4 (3,4-dicarboxyphenoxy)phenyl]propane dianhydride;
4,4'-bis(3,4-dicarboxyphenoxy)diphenyl ether dianhydride;
4,4'-bis(3,4-dicarboxyphenoxy)diphenyl sulfide dianhydride;
1,3-bis(3,4-dicarboxyphenoxy)benzene dianhydride;
1,4-bis(3,4-dicarboxyphenoxy)benzene dianhydride;
4,4'-bis(3,4-dicarboxyphenoxy)benzophenone dianhydride;
4-(2,3-dicarboxyphenoxy)-4'-(3,4-dicarboxyphenoxy)diphenyl-2,2-propane dianhydride; and mixtures of such dianhydrides.

The organic diamines of formula (XX) are chosen from the group consisting of m-phenylenediamine, p-phenylenediamine, 2,2-bis(p-aminophenyl)propane, 4,4'-diaminodiphenyl-methane, 4,4'-diaminodiphenyl sulfide, 4,4'-diamino diphenyl sulfone, 4,4'-diaminodiphenyl ether, 1,5-diaminonaphthalene, 3,3'-dimethylbenzidine, 3,3'-dimethoxybenzidine, and mixtures thereof; preferably, the organic diamines of formula (XX) are chosen from the group consisting of m-phenylenediamine and p-phenylenediamine and mixture thereof.

According to an embodiment, P is a PEI comprising at least 50 mol. %, based on the total number of moles in the polymer, of recurring units ($R_{PEI}$) of formulas (XXIII) or (XXIV), in imide forms, or their corresponding amic acid forms and mixtures thereof:

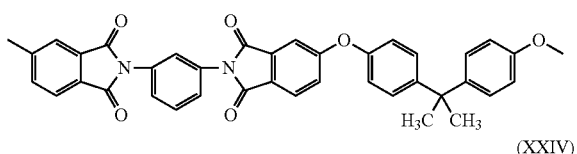

(XXIII)

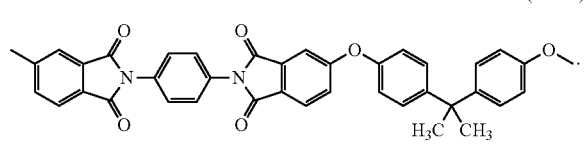

(XXIV)

In a preferred embodiment of the present invention, at least 50 mol. %, at least 60 mol. %, at least 70 mol. %, at least 80 mol. %, at least 90 mol. %, at least 95 mol. %, at least 99 mol. % or all of the recurring units in the PEI are recurring units ($R_{PSI}$) of formulas (XXIII) or (XXIV), in imide forms, or their corresponding amic acid forms and mixtures thereof.

Solvent

The concentration of the solvent may be between 1 to 80 wt. %, based on the total weight of the formulation (F), for example between 2 and 75 wt. %, between 5 and 70 wt. % or between 10 and 65 wt. %.

According to an embodiment of the present invention, the solvent is selected from the group consisting of N-methylpyrrolidone (NMP), N,Ndimethylformamide (DMF), N,N-dimethylacetamide (DMAC), 1,3-dimethyl-2-imidazolidinone, tetrahydrofuran (THF), dimethyl sulfoxide (DMSO) and sulfolane.

Preferably, the solvent is a dipolar aprotic solvent. Preferably, the solvent is selected from the group consisting of N-methylpyrrolidone (NMP), dimethylacetamide (DMAc or DMA), N-Cyclohexyl-2-pyrrolidone (CHP) and dimethyl sulfoxide (DMSO).

Photoinitiator

According to the present invention, the photoinitiator is a compound especially added to a formulation to convert absorbed light energy, UV or visible light, into chemical energy in the form of initiating species, for example free radicals or cations. Based on the mechanism by which initiating radicals are formed, photoinitiators are generally divided into two classes:

Type I photoinitiators undergo a unimolecular bond cleavage upon irradiation to yield free radicals, Type II photoinitiators undergo a bimolecular reaction where the excited state of the photoinitiator interacts with a second molecule (a coinitiator) to generate free radicals.

The concentration of the photoinitiator in the formulation (F) may be between 0.05 to 10 wt. %, based on the total weight of the formulation (F), for example between 0.1 and 5 wt. %, between 0.2 and 4 wt. % or between 0.5 and 3 wt. %.

According to an embodiment of the present invention, the photoinitiator is selected from the group consisting of:
Acetophenone
Anisoin
Anthraquinone
Anthraquinone-2-sulfonic acid, sodium salt monohydrate
(Benzene) tricarbonylchromium
Benzil
Benzoin
Benzoin ethyl ether, Benzoin isobutyl ether, Benzoin methyl ether and Benzophenone
3,3',4,4'-Benzophenonetetracarboxylic dianhydride
4-Benzoylbiphenyl
2-Benzyl-2-(dimethylamino)-4'-morpholinobutyrophenone
4,4'-Bis(diethylamino)benzophenone
4,4'-Bis(dimethylamino)benzophenone
Camphorquinone
2-Chlorothioxanthen-9-one
(Cumene)cyclopentadienyliron(II) hexafluorophosphate
Dibenzosuberenone
2,2-Diethoxyacetophenone
4,4'-Dihydroxybenzophenone
2,2-Dimethoxy-2-phenylacetophenone
4-(Dimethylamino)benzophenone
4,4'-Dimethylbenzil
2,5-Dimethylbenzophenone
3,4-Dimethylbenzophenone Diphenyl(2,4,6-trimethylbenzoyl)phosphine oxide, 2-Hydroxy-2-methylpropiophenone and blends (e.g. 50/50 blend)
4'-Ethoxyacetophenone
2-Ethylanthraquinone
Ferrocene
3'-Hydroxyacetophenone, 4'-Hydroxyacetophenone, 3-Hydroxybenzophenone and 4-Hydroxybenzophenone
1-Hydroxycyclohexyl phenyl ketone
2-Hydroxy-2-methylpropiophenone
2-Methylbenzophenone or 3-Methylbenzophenone
Methybenzoylformate
2-Methyl-4'-(methylthio)-2-morpholinopropiophenone
Phenanthrenequinone
4'-Phenoxyacetophenone
Phenylbis(2,4,6-trimethylbenzoyl)phosphine oxide
Thioxanthen-9-one
Triarylsulfonium hexafluoroantimonate salts, mixed, 50% in propylene carbonate
Triarylsulfonium hexafluorophosphate salts, mixed, 50% in propylene carbonate, and
mixture thereof.

Preferably, the photoinitiator is selected from the group consisting of 2,2-dimethoxy-2-phenylacetophenone (DMPA), Diphenyl(2,4,6-trimethylbenzoyl)phosphine oxide and Phenylbis(2,4,6-trimethylbenzoyl)phosphine oxide.

Blocker

According to the present invention, a blocker is a compound that is added to the formulation in order to (i) scavenge a predetermined amount of radicals formed by the photoinitiator while irradiated by UV light, (ii) scavenge unused radicals that may be present after the UV irradiation source has been turned off, and/or (iii) absorb a portion of the energy that is delivered to the system during UV irradiation.

The concentration of the blocker in the formulation (F) may be between 0.05 to 10 wt. %, based on the total weight of the formulation (F), for example between 0.1 and 5 wt. %, between 0.2 and 4 wt. % or between 0.5 and 3 wt. %.

According to an embodiment of the present invention, the blocker is selected from the group consisting of:
2-hydroxy-4-methoxy benzophenone (oxybenzone)
1-(4-methoxyphenyl)-3-(4-tert-butylphenyl)propane-1,3-dione (avobenzone)
disodium 2,2'-(1,4-phenylene)bis(6-sulfo-1H-benzimidazole-4-sulfonate) (bisdisulizole disodium)
hexyl 2-[4-(diethylamino)-2-hydroxybenzoyl]benzoate (diethylamino hydroxybenzoyl hexyl benzoate)
menthyl-o-aminobenzoate (menthyl anthranilate)
2,2'-[6-(4-methoxyphenyl)-1,3,5-triazine-2,4-diyl]bis{5-[(2-ethylhexyl)oxy]phenol}(bemotrizinol)
2,4-dihydroxybenzophenone
2,2',4,4'-tetrahydroxybenzophenone
4-Hydroxy-2-methoxy-5-(oxo-phenylmethyl)benzenesulfonic acid (sulisobenzone)
2,2'-dihydroxy-4,4'-dimethoxybenzophenone
5-chloro-2-hydroxybenzophenone
(2-hydroxy-4-methoxyphenyl)-(2-hydroxyphenyl)methanone (dioxybenzone)
2,5-Bis(5-tert-butyl-benzoxazol-2-yl)thiophene
sodium 2,2'-dihydroxy-4,4'-dimethoxybenzophenone-5,5'-disulfonate
(2-hydroxy-4-methoxyphenyl)(4-methylphenyl)methanone (mexenone)
(2-hydroxy-4-octoxy-phenyl)-phenyl-methanone (octabenzone)
2-(1,2,3-Benzotriazol-2-yl)-4-methyl-6-[2-methyl-3-(2,2,4,6,6-pentamethyl-3,5-dioxa-2,4,6-trisilaheptan-4-yl)propyl]phenol (drometrizole trisiloxane)
terephthalylidene dicamphor sulfonic acid (ecamsule)
2-ethylhexyl 2-cyano-3,3-diphenyl-2-propenoate (octocrylene)
diethylhexyl butamido triazone (iscotrizinole)
2-Ethoxyethyl 3-(4-methoxyphenyl)propenoate (cinoxate)
isopentyl 4-methoxycinnamate (amiloxate)
2,2'-methanediylbis[6-(2H-benzotriazol-2-yl)-4-(2,4,4-trimethylpentan-2-yl)phenol](bisoctrizole)
2-(2H-benzotriazol-2-yl)-4-(1,1,3,3-tetramethylbutyl)phenol
2,2'-methylenebis[6-(2H-benzotriazol-2-yl)-4-(1,1,3,3-tetramethylbutyl)phenol]
2-hydroxy-4-(octyloxy)benzophenone
2-ethyl-, 2-[4-(4,6-diphenyl-1,3,5-triazin-2-yl)-3-hydroxyphenoxy]ethyl ester 2-tert-butyl-6-(5-chloro-2H-benzotriazol-2-yl)-4-methylphenol
2-(2-hydroxy-5-methylphenyl)benzotriazole
2,4-dinitrophenylhydrazine
N-(4-ethoxycarbonylphenyl)-N'-methyl-N'-phenylformamidine
hexadecyl 3,5-bis-tert-butyl-4-hydroxybenzoate
2-ethyl-2'-ethoxy-oxalanilide, and
mixture thereof.

Preferably, the blocker is selected from the group consisting of avobenzone and 2,5-Bis(5-tert-butyl-benzoxazol-2-yl)thiophene.

Optional Components

The formulation of the present invention may comprise at least one additive, for example selected from the group consisting of fillers such as silica, antioxidants, antibacterial compounds and antistatic compounds. The additive may for example be a chemically inert species such as carbon black, silica (e.g. microsilica particles) and carbon nano tubes.

Process for Manufacturing a 3D Article

The present invention also relates to a method for manufacturing a 3D article with an additive manufacturing system, comprising:
providing a polymer formulation (F) as above-described,
printing layers of the 3D article from the polymer formulation (F).

According to an embodiment, the step of printing comprises irradiating the polymer formulation (F), for example a layer of such formulation (F) deposited onto the printing surface, with UV light. The layer preferably presents a size in the range of 10 μm to 300 μm, for example 50 μm to 150 μm.

The UV light can for example be laser light. The irradiation is preferably of sufficient intensity to cause substantial curing of the polymer formulation (F), for example the layer of such formulation (F). Also, the irradiation is preferably of sufficient intensity to cause adhesion of the layers of polymer formulation (F).

According to another embodiment of the present invention, the method for manufacturing a 3D article with an additive manufacturing system, comprises the steps of:
providing a polymer formulation (F) as above-described,
printing layers of the 3D article from the polymer formulation (F) by:
a) coating a layer of the formulation (F) onto a surface,
b) irradiating the layer with UV light, c) coating a layer of the formulation (F) onto the former irradiated layer,
d) irradiating the layer with UV light and
e) repeating steps c) and d) a sufficient number of times to manufacture the 3D article.

According to an embodiment, the polymer formulation (F) is at room temperature during the process. Alternatively, the formulation can be heated before and/or during printing, especially if the polymer concentration in the formulation is high. In this case, the temperature can be heated up to 130° C., up to 120° C. or up to 110° C. before and/or during printing.

Applications

The present invention also relates to the use of the polymer (P) of the present invention or of the polymer formulation (F) of the present invention, for the manufacture of 3D objects/articles.

All of the embodiments described above with respect to the polymer (P) and the polymer formulation (F) do apply equally to the use for the manufacture of 3D objects/articles.

The present invention also relates to 3D objects or 3D articles obtainable, at least in part, from the method of manufacture of the present invention, using the polymer (P) or the polymer formulation (F) herein described.

The 3D objects or articles obtainable by such method of manufacture can be used in a variety of final applications. Mention can be made in particular of implantable device, dental prostheses, brackets and complex shaped parts in the aerospace industry and under-the-hood parts in the automotive industry.

Should the disclosure of any patents, patent applications, and publications which are incorporated herein by reference conflict with the description of the present application to the extent that it may render a term unclear, the present description shall take precedence.

The invention will be now described in more detail with reference to the following examples whose purpose is merely illustrative and not limitative of the scope of the invention.

EXAMPLES

Example 1—Synthesis of PSU Polymer According to the Invention

Materials 4-(Dimethylamino)pyridine (DMAP) (Sigma-Aldrich, ≥99%), acryloyl chloride (Sigma-Aldrich, ≥97%), triethylamine (TEA) (Sigma-Aldrich, ≥99%), potassium carbonate (Fisher Chemical), Toluene (Fisher Chemical), N,N-dimethylacetamide anhydrous (DMAc) (Acros Organics, 99.5%), sodium chloride (Fisher Chemical), magnesium sulfate (Spectrum), diphenyl(2,4,6-trimethylbenzoyl)phosphine oxide (97%, Sigma Aldrich), sodium bicarbonate (Spectrum), hydrochloric acid (Fisher Scientific) and chloroform anhydrous (Sigma-Aldrich, ≥99%) were used as received. Bis(4-chlorophenyl) sulfone (98%) and bisphenol A (≥99%) were purchased from Sigma-Aldrich and recrystallized in toluene. Nitrogen gas (99.999%) was purchased from Praxair. All materials were used as received unless otherwise specified.

Analytical Methods $^1$H nuclear magnetic resonance (NMR) spectroscopy was performed at 23° C. using a Varian Unity 400 at 400 MHz. Deuterated chloroform (CDCl$_3$) served as the solvent for all polymers.

Waters Acquity Advanced Permeation Chromatography (APC) was used to characterize molecular weights (Mn) of the polymers at 35° C. relative to polystyrene standards. Acquity APC XT columns were utilized at a flow rate of 1 mL/min with a sample concentration of 1 mg/mL.

Thermogravimetric analysis (TGA) was performed from 25 to 600° C. at 10° C./min using a TA Instruments Q50 under constant N$_2$ flow.

Differential scanning calorimetry (DSC) was conducted using a TA instruments Q1000 DSC with RCS90 refrigerated cooling system and 50 mL/min nitrogen sample cell purge. The instrument was calibrated using indium (Tm=156.60° C.) and zinc (Tm=419.47° C.) standards. An initial heating rate of 10° C./min was used followed by a quench cool of 100° C./min to remove thermal history. The second heat cycle at 10° C./min was used to calculate thermal transitions. Glass transition temperatures (Tg) were determined via inflection point in TA Universal Analysis software.

Photorheology was performed on a TA Instruments DHR-2 rheometer with 20 mm parallel plate geometry, Smart Swap™ UV curing accessory, and Omnicure S2000 light source with broad spectrum bulb and 320-500 nm filter installed, enabling wavelengths in this window to pass through to the sample. An oscillation analysis at 25° C. using 0.3% strain and 4 Hz was performed on the polymer. The sample was subjected to oscillation for 30 s prior to UV irradiation with an intensity of 250 mW/cm$^2$ for 200 s.

Storage (G') and loss (G") shear moduli were obtained and analyzed with the TA TRIOS software package, with G'/G" crossover points determined as by the software. The plateau modulus (G_N^0) was determined by averaging the last 100 data points in the storage modulus curve.

Step 1—Synthesis of the Hydroxyl-Terminated PSU Polymer

This example demonstrates the synthesis of a hydroxyl-terminated PSU polymer at controlled molecular weight according to scheme 1 below:

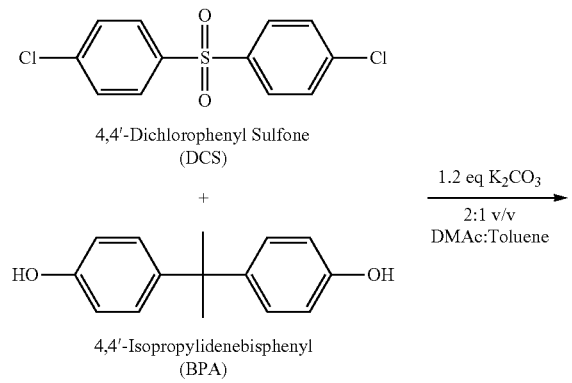

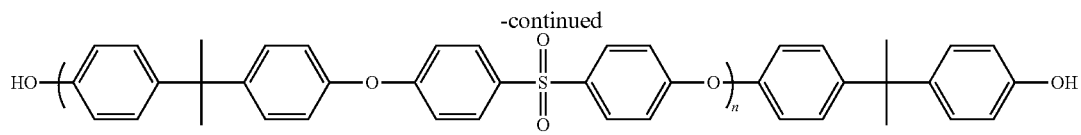

Polysulfone (PSU) polymers were synthesized with an excess of bisphenol A monomer (BPA) in order to control the molecular weight of the final polymer and produce hydroxyl end-groups.

An example of synthesis of a PSU with target Mn of 6,000 g/mol PSU (ratio BPA:DCS=1.08:1) is as follows: Bisphenol A (11.11 g, 0.049 mol), 4,4'-dichlorophenyl sulfone (12.98 g, 0.045 mol), potassium carbonate (8.07 g, 0.058 mol), anhydrous N,N-dimethylacetamide (160 mL), and toluene (80 mL) were weighed into a three-necked, round-bottom flask fitted with a Dean-Stark trap and mechanical stir rod. The heterogenous solution was purged with $N_2$ for 10 min. The reaction was then heated at 160° C. for 4 hours while monitoring the water removal through a toluene/water azeotrope in the Dean-Stark trap. The reaction temperature was increase to 180° C. and toluene was removed over 12 h. The resulting solution was filtered to remove the salts. Purification occurred through precipitation into 4 L of distilled water. The resulting white polymer was filtered and dried overnight in vacuo at 210° C.

Step 2—Synthesis of the Acrylate Terminated PSU Polymer

This example demonstrates the synthesis of a acrylate terminated PSU polymer at controlled molecular weight according to scheme 2 below:

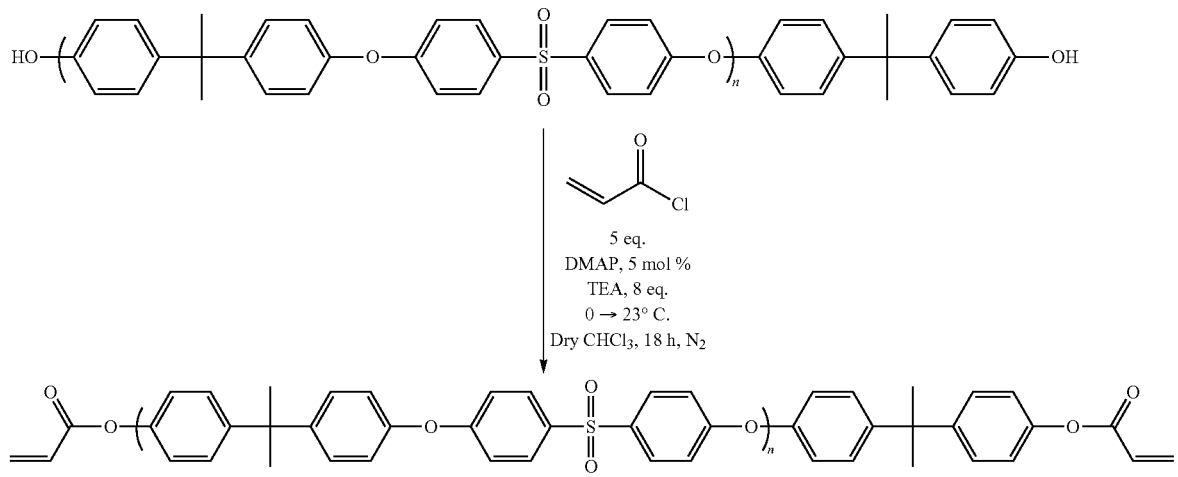

Scheme 2 outlines the general synthesis for the acrylate terminated PSU oligomer. PSU from step 1 (5.00 g, 0.0009 mol) and DMAP (0.0058 g, 0.000048 mol) were charged into a 100-mL round-bottom flask. The reaction was purged with $N_2$ for 10 min followed by addition of anhydrous $CHCl_3$ (50 mL). Once homogenous, the reaction was cooled to 0° C. Triethylamine (0.74 g, 0.0073 mol) was added via syringe and once dissolved, acryloyl chloride (0.41 g, 0.0046 mol) was then added dropwise over the course of 1 min. The reaction solution was allowed to warm to room temperature overnight. The solution was then washed twice with 2 M aqueous HCl to remove excess DMAP and convert excess TEA into salt form, and then stirred over basic alumina (~5 g) for 3 h. The solution was subsequently filtered and then washed twice with saturated sodium bicarbonate solution and finally once with brine. The resulting yellow solid was dried in vacuo at 40° C. for 18 h.

Results

1H NMR spectroscopy confirmed the quantitative conversion of the hydroxyl terminated PSU to acrylate terminated PSU. The observation and integration of the acrylate protons between 6-7 ppm, relative to backbone resonances, was a clear indicator of quantitative termination.

The Differential Scanning calorimetry at 20° C./min demonstrated that the final polymer had a $T_g$=167° C.

Target Mn: 6,000 g/mol

GPC Mn: 5,700 g/mol

PDI: 2.41

Titration Mn: 7,260 g/mol

Example 2—Printing of the PSU Polymer

Step 1—Preparation of the Formulations

The components and weight % of each component relative to the total weight of the formulations is indicated in Table 1.

TABLE 1

| | Wt. % | |
| --- | --- | --- |
| | Formulation 1 (comparative) | Formulation 2 (inventive) |
| Acrylate terminated PSU (6K) | 29.9 | 29.9 |
| DMPA | 0.30 | 0.3 |
| NMP | 69.8 | 69.78 |
| Avobenzone (UV blocker) | — | 0.015 |

Step 2—Printing

The formulations were transferred into a glass beaker and levelled to the focus of the projector. A ULTEM® build platform, fabricated via filament extrusion, was inserted into the resin beaker. The build platform was flushed with the resin surface and then lowered into the resin by 100 µm. The STL file of the test specimen was sliced into 100 µm slices and converted into mono-chrome Bitmap images. The Bitmap image, corresponding to the first layer of the part, was projected on the resin surface for 8 seconds using a 365 nm light source set to an intensity of 15 W/cm². The build platform was then lowered into the resin for recoating with a fresh layer of resin. Subsequent layers were fabricated using an exposure time of 8 seconds/layer followed by the recoating step. The process was continued until the complete part was fabricated. The fabricated 3D parts were extracted from the build platform and rinsed with NMP to remove any residual uncured resin. The parts were then wiped dry with Kim Wipes™ and transferred onto a glass slide for measurements.

Results

Figure 2:
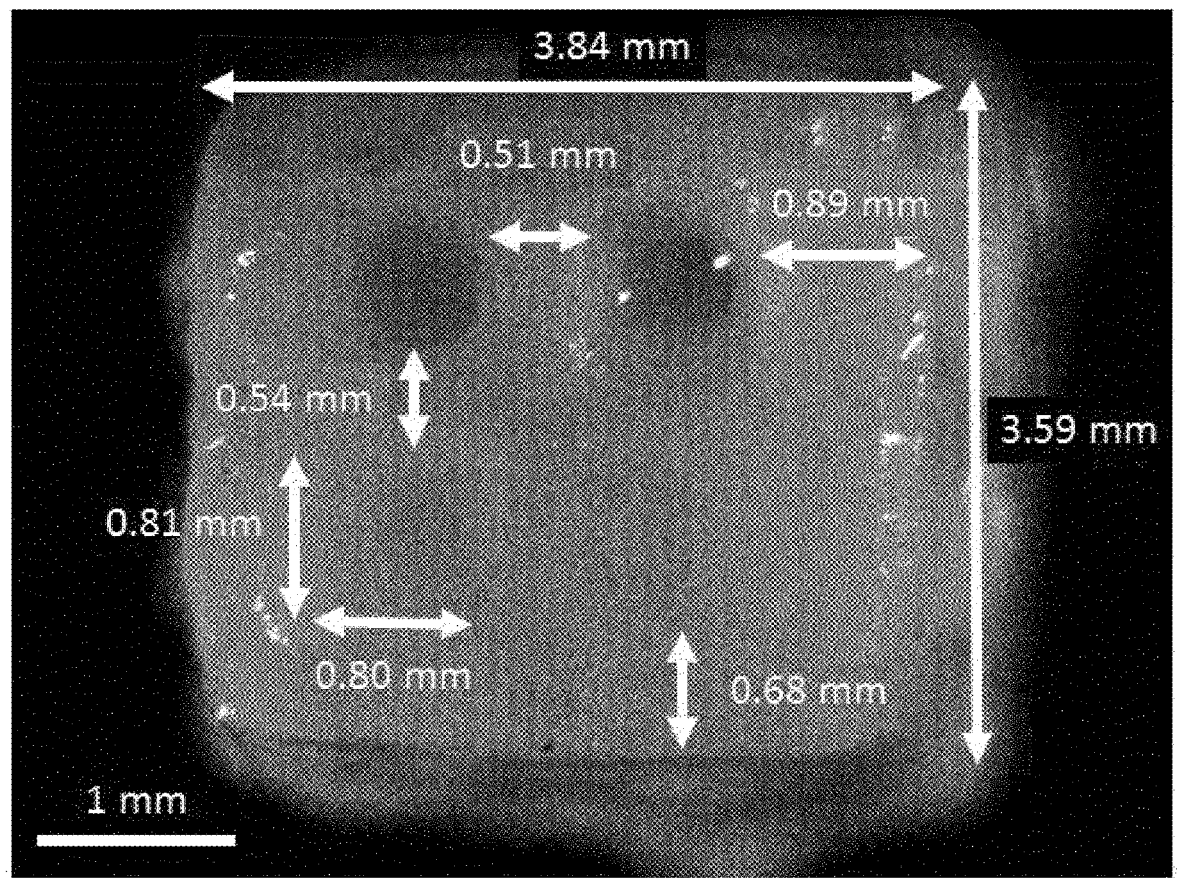
FIG. 2 is a picture of the object printed from the comparative formulation 1.

As shown on FIG. 2, the part fabricated with comparative formulation 1 does not fully exhibit the designed porosity. The pores are either fully closed or partially closed. This can be attributed to overcuring. This formulation results in the fabrication of parts with poor feature resolution.

Figure 3:
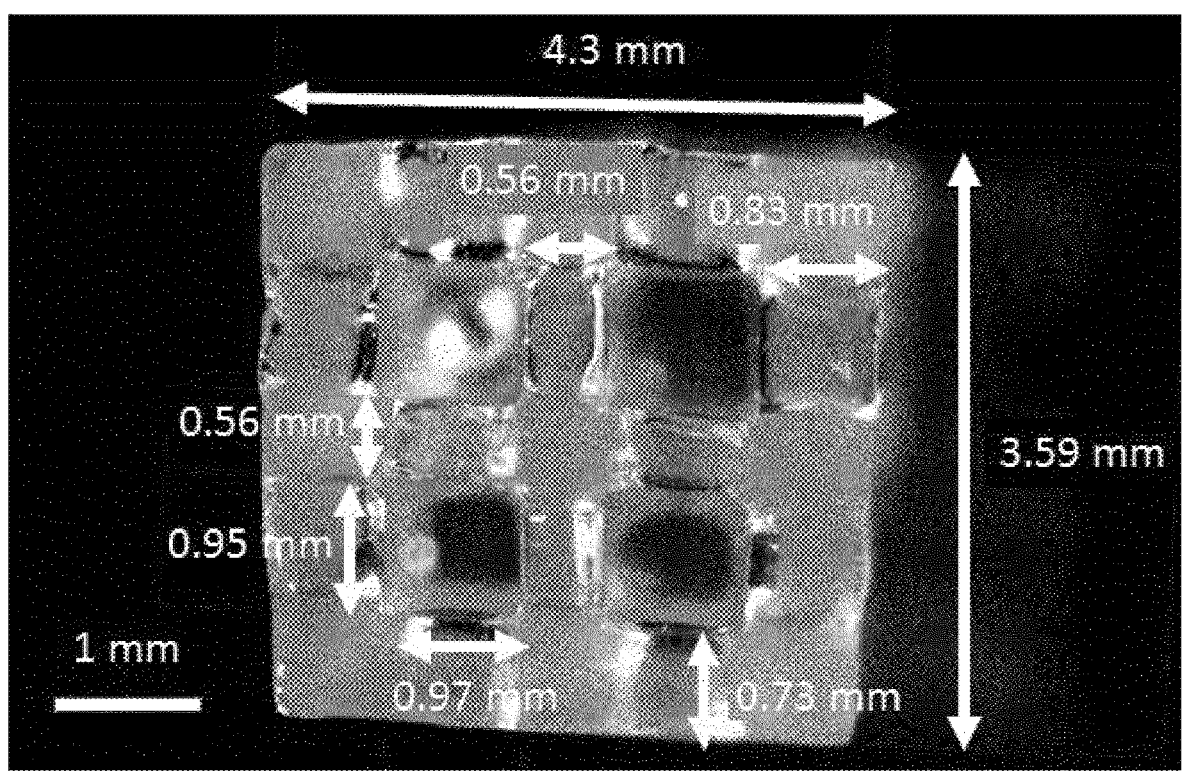
FIG. 3 is a picture of the object printed from the inventive formulation 2.

As shown on FIG. 3, the part fabricated with inventive formulation 2 exhibits all of the designed porosity. This can be attributed to the prevention of overcuring by the addition of the UV blocker, avobenzone. This formulation results in the fabrication of parts with superior feature resolution.

The invention claimed is:

1. A polymer formulation (F) comprising, based on the total weight of the formulation (F):
   from 1 to 50 wt. %, based on the total weight of F, of at least one polymer (P) selected from the group consisting of poly(aryl ethersulfone) (PAES) polymer and polyetherimide (PEI) polymer, wherein the polymer (P) comprises at least one terminal group of formula (M1) or (M2)

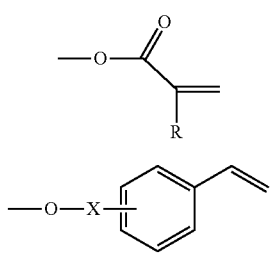

(M1)

(M2)

wherein
   R is H or CH₃,
   X is a bond or (CH₂)ₙ with n ranging from 1 to 20, and
   wherein the number average molecular weight (Mn) of the polymer (P) is of less than 40,000 g/mol, as determined by gel permeation chromatography (GPC) using methylene chloride as a mobile phase and polystyrene standards,
   at least one solvent,
   at least one photoinitiator, and
   at least one blocker compound.

2. The formulation of claim 1, wherein P is a PAES comprising recurring units (RPAEs) of formula (L):

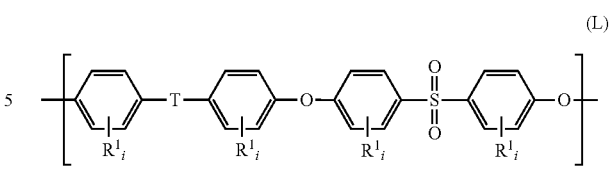

(L)

each R1 is independently selected from the group consisting of a halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium;

each i is an independently selected integer from 0 to 4 for each aromatic cycle;

T is selected from the group consisting of a bond, —CH₂—; —O—; —SO₂—; —S—; —C(O)—; —C(CH₃)₂—; —C(CF₃)₂—; —C(=CCl₂)—; —C(CH₃)(CH₂CH₂COOH)—; —N=N—; —R$_a$C=CR$_b$—, where each R$_a$ and R$_b$, independently of one another, is a hydrogen or a C1-C12-alkyl, C1-C12-alkoxy, or C6-C18-aryl group; —(CH₂)$_m$— and —(CF₂)$_m$— with m being an integer from 1 to 6; an aliphatic divalent group, linear or branched, of up to 6 carbon atoms; and combinations thereof.

3. The formulation of claim 2, wherein T is selected from the group consisting of a bond, —SO₂— and —C(CH₃)₂—.

4. The formulation of claim 2, wherein the PAES polymer comprises at least 50 mol. % (based on the total number of moles in the polymer) of recurring units of formula (L).

5. The formulation of claim 2, wherein the PAES polymer comprises at least 50 mol. % (based on the total number of moles in the polymer) of recurring units selected from the group consisting of formulas:

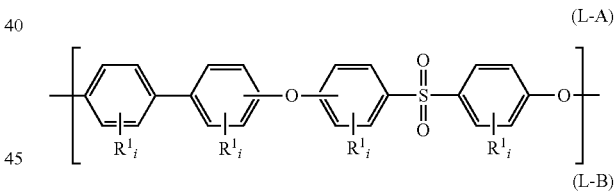

(L-A)

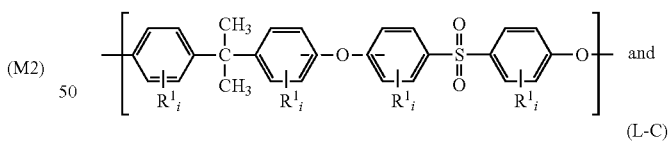

(L-B)

and

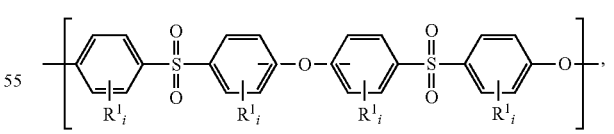

(L-C)

wherein R¹ and i are as above-mentioned.

6. The formulation of claim 1, wherein P is a PEI comprising recurring units (R$_{PE1}$) comprising at least one aromatic ring, at least one imide group, as such and/or in its amic acid form, and at least one ether group.

7. The formulation of claim 1, wherein:
   the solvent is selected from the group consisting of N-methylpyrrolidone (NMP), N,N-dimethylformamide (DMF), N,N-dimethylacetamide (DMAC), 1,3-dimethyl-2-imidazolidinone, tetrahydrofuran (THF), dimethyl sulfoxide (DMSO) and sulfolane, the photoinitiator is selected from the group consisting of 2,2-dimethoxy-2-phenylacetophenone (DMPA), Diphenyl(2,4,6-trimethylbenzoyl)phosphine oxide and phenylbis(2,4,6-trimethylbenzoyl)phosphine oxide, and/or the blocker is selected from the group consisting of avobenzone and 2,5-Bis(5-tert-butyl-benzoxazol-2-yl) thiophene.

8. A method for manufacturing a 3D article with an additive manufacturing system, comprising:

providing the polymer formulation (F) according of claim 1, and printing layers of the 3D article from the polymer formulation (F).

9. The method of claim 8, wherein the step of printing comprises irradiating the polymer composition with UV light.

10. The method of claim 9, wherein the UV light is laser light.

11. The 3D article obtainable, at least in part, by the method of claim 8.

12. A method for manufacturing a 3D object, the method comprising using the polymer formulation (F) of claim 1 for the manufacture of 3D objects by stereolithography.

13. The formulation of claim 1, wherein the at least one blocker compound scavenges a predetermined amount of radicals formed by the photoinitiator while irradiated by UV light.

14. The formulation of claim 1, wherein the at least one blocker compound scavenges unused radicals that may be present after UV light is turned off.

15. The formulation of claim 1, wherein the at least one blocker compound absorbs a portion of the incident UV light.

* * * * *